(12) United States Patent
DeLay et al.

(10) Patent No.: US 7,641,949 B2
(45) Date of Patent: Jan. 5, 2010

(54) PRESSURE VESSEL WITH IMPROVED IMPACT RESISTANCE AND METHOD OF MAKING THE SAME

(75) Inventors: Thomas K. DeLay, Huntsville, AL (US); James E. Patterson, Brigham City, UT (US); Michael A. Olson, Brigham City, UT (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 513 days.

(21) Appl. No.: 10/857,379

(22) Filed: May 20, 2004

(65) Prior Publication Data

US 2005/0260373 A1  Nov. 24, 2005

(51) Int. Cl.
 *B28B 23/00* (2006.01)
 *B29C 70/08* (2006.01)
 *F17C 1/06* (2006.01)
(52) U.S. Cl. .............. 428/35.5; 428/34.6; 428/36.3; 220/586; 220/588; 220/589; 220/590
(58) Field of Classification Search .......... 428/34.5, 428/34.6, 36.3, 36.4; 220/586, 588, 589, 220/590, 592
See application file for complete search history.

(56) References Cited

U.S. PATENT DOCUMENTS

| | | | | |
|---|---|---|---|---|
| 3,655,863 | A * | 4/1972 | Andersen | 264/294 |
| 4,690,295 | A * | 9/1987 | Wills | 220/590 |
| 4,699,288 | A * | 10/1987 | Mohan | 220/590 |
| 4,877,663 | A | 10/1989 | Kambe et al. | |
| 5,397,847 | A * | 3/1995 | Harris et al. | 525/432 |
| 5,468,808 | A | 11/1995 | Peacock | |
| 5,758,796 | A * | 6/1998 | Nishimura et al. | 220/590 |
| 5,763,027 | A * | 6/1998 | Enders et al. | 428/34.7 |
| 5,918,759 | A | 7/1999 | Beckmann et al. | |
| 6,190,481 | B1 * | 2/2001 | Iida et al. | 156/175 |
| 6,341,708 | B1 * | 1/2002 | Palley et al. | 220/1.5 |
| 6,389,594 | B1 | 5/2002 | Yavin | |
| 6,451,420 | B1 | 9/2002 | Jin et al. | |
| 6,485,828 | B2 | 11/2002 | Deguchi et al. | |
| 6,548,618 | B2 | 4/2003 | Sullivan et al. | |

(Continued)

OTHER PUBLICATIONS

WO 02/100355, Dec. 2002.*

*Primary Examiner*—Donald Loney
(74) *Attorney, Agent, or Firm*—James J. McGroary; David A. Belasco

(57) ABSTRACT

A composite overwrapped pressure vessel is provided which includes a composite overwrapping material including fibers disposed in a resin matrix. At least first and second kinds of fibers are used. These fibers typically have characteristics of high strength and high toughness to provide impact resistance with increased pressure handling capability and low weight. The fibers are applied to form a pressure vessel using wrapping or winding techniques with winding angles varied for specific performance characteristics. The fibers of different kinds are dispersed in a single layer of winding or wound in distinct separate layers. Layers of fabric comprised of such fibers are interspersed between windings for added strength or impact resistance. The weight percentages of the high toughness and high strength materials are varied to provide specified impact resistance characteristics. The resin matrix is formed with prepregnated fibers or through wet winding. The vessels are formed with or without liners.

20 Claims, 6 Drawing Sheets

U.S. PATENT DOCUMENTS

| | | |
|---|---|---|
| 6,601,497 B2 | 8/2003 | Ghiorse et al. |
| 2002/0106510 A1 | 8/2002 | Deguchi et al. |
| 2002/0117781 A1* | 8/2002 | LeBreton .................... 264/314 |
| 2002/0178900 A1 | 12/2002 | Ghiorse et al. |
| 2003/0037860 A1* | 2/2003 | Hauber ....................... 156/172 |
| 2003/0082380 A1 | 5/2003 | Hager et al. |
| 2003/0183638 A1* | 10/2003 | Minta et al. ............ 220/560.13 |
| 2004/0040969 A1 | 3/2004 | DeLay et al. |

* cited by examiner

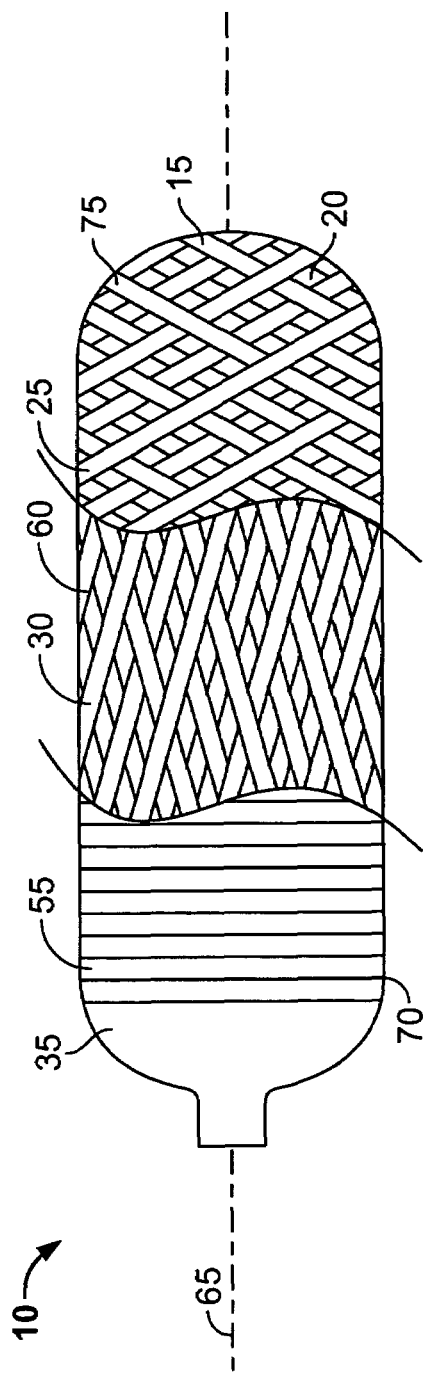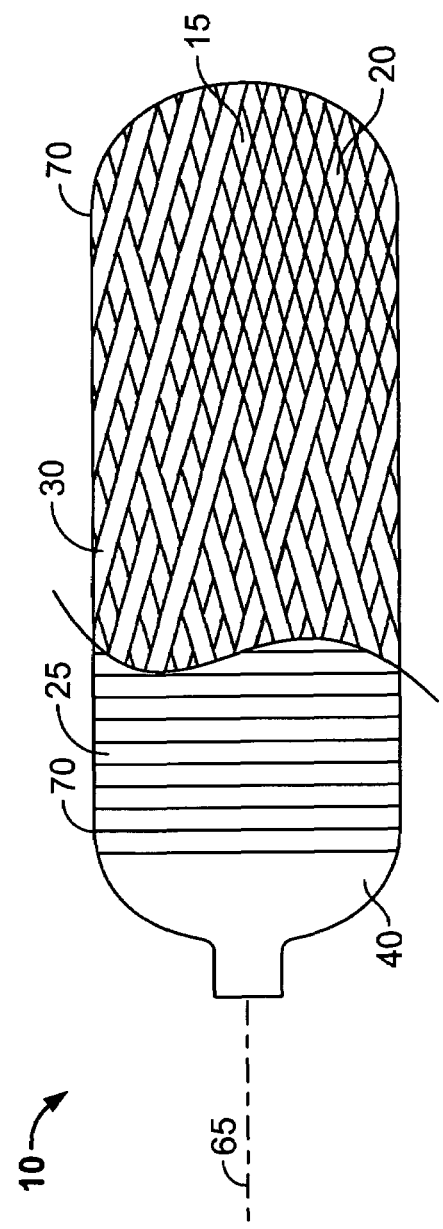

PRESSURE VESSEL WITH IMPROVED IMPACT RESISTANCE AND METHOD OF MAKING THE SAME

ORIGIN OF THE INVENTION

This invention was made with Government support under contract NAS8-01146 awarded by the National Aeronautics and Space Administration. The Government has certain rights under this invention.

FIELD OF THE INVENTION

The present invention relates to pressure vessels and, more particularly, to a composite overwrapped pressure vessel having improved impact resistance.

BACKGROUND OF THE INVENTION

The development of advanced composite materials has enabled the development of tanks and pressure vessels which are of lightweight and which have very thin walls. It will be appreciated that for aerospace applications, weight is a key parameter. More specifically, weight conservation is extremely important in such aerospace applications because the lighter the tank or pressure vessel, the more weight that can be allotted to the vehicle payload. Stated differently, cost is a barrier for commercial space applications, and every pound saved in the weight of a vehicle tank or pressure vessel can translate to a corresponding one pound increase in payload. The weight problem has been addressed through the use of high performance materials.

However, a challenge presented by such new high performance materials is the low impact damage tolerance thereof.

Exploring the latter point in more detail, high performance, filament wound composite pressure vessels, such as are used in solid propellant propulsion, spacecraft energy storage systems, and other similar demanding applications, have always been susceptible to damage from low velocity impact in both operational and non-operational environments. Concrete examples of this include a dropped wrench during the fabrication or assembly of the pressure vessel or the system with which the vessel is integrated, and an accidental "nudge" from a forklift or other of the innumerable tooling devices involved in the fabrication and assembly operations. It is noted that these things may or may not degrade the capability of the pressure vessel and a particularly worrisome problem is that these impacts, and the damage therefrom, may not be detectable. Thus, the need exists for a way to improve the capability of these pressure vessels to withstand such potentially degrading impacts, particularly if this can be done with little or no appreciable degradation in pressure vessel performance and without any increase in weight.

SUMMARY OF THE INVENTION

In accordance with the invention, a pressure vessel is provided which overcomes or greatly ameliorates the problems discussed above. According to one aspect of the invention, a high performance composite pressure vessel is provided which affords a significant improvement in low velocity impact resistance. The pressure vessel is both light in weight and robust, and thus has obvious applications in aerospace wherein there are low margins of safety, i.e., very little excess capacity to allow for impact damage. Other less obvious but no less important applications include use in the field of filament wound self-contained breathing apparatus (SCBA) cylinders for fire fighters and hazmat personnel, wherein a more robust air cylinder of a comparable weight to existing cylinders would be of interest.

(1) An improved pressure vessel providing the desired features includes a composite material having fibers located in a resin matrix. The improvement includes at least first and second sets of fibers.

(2) In a variant of the invention, the first set of fibers includes high strength fibers.

(3) In a further variant, the first set of fibers includes high modulus materials.

(4) In still a further variant, the second set of fibers includes fibers having high toughness characteristics.

(5) In another variant, the second set of fibers includes high modulus materials.

(6) In still another variant, the second set of fibers includes fibers having low stiffness characteristics.

(7) In yet another variant, the second set of fibers includes fibers having low compressibility characteristics.

(8) In still another variant of the invention, the first set of fibers includes materials selected from the group consisting of: carbon, high strength carbon, and steel.

(9) In a further variant of the invention, the second set of fibers includes materials select from the group consisting of: glass, long-chain polyamide (Aramid), liquid crystal polymer, polyethylene, metal, crosslinkable elastomer, crosslinkable thermoplastic, and crosslinkable thermoplastic elastomer.

(10) In still a further variant, the second set of fibers includes p-phenylenebenzobisoxazole.

(11) In yet a further variant, the second set of fibers includes poly{2,6-diimidazo[4,5-b4',5'-e] pyridinylene-1,4 (2,5-dihydroxy)phenylene}, (PIPD) (M-5).

(12) In another variant of the invention, the second set of fibers includes polyaramid polyparaphenylene terephthalamide (Kevlar).

(13) In still another variant, the second set of fibers includes ultra-high-molecular-weight polyethylene (Spectra).

(14) In yet another variant, the second set of fibers includes polyester-polyarylate (Vectran).

(15) In a further variant, the improved pressure vessel includes a thin walled liner.

(16) In still a further variant, the improved pressure vessel includes a metal inner lining.

(17) In yet a further variant, the first and second sets of fibers are mixed together with a high degree of dispersement.

(18) In another variant of the invention, the fibers include separate distinct layers of the first and second sets of fibers.

(19) In still another variant, at least one layer of the first and second sets of fibers mixed together with a high degree of dispersement is layered with at least one layer of fibers of either only the first set of fibers or only the second set of fibers.

(20) In yet another variant, at least one layer of the first and second sets of fibers mixed together with a high degree of dispersement is layered with at least one layer of fibers of only the first set of fibers and at least one layer of only the second set of fibers.

(21) In a further variant of the invention, the second set of fibers includes at least about 10% by fiber weight of the first and second sets of fibers.

(22) In still a further variant, the second set of fibers includes about 5% to 55% by fiber weight of the first and second sets of fibers.

(23) In yet a further variant, the at least one layer of the first and second sets of fibers mixed together with a high degree of dispersement includes about 5% to 30% by fiber weight of the first and second sets of fibers.

(24) In another variant, the at least one layer of fibers of either only the first set of fibers or only the second set of fibers includes about 5% to 30% by fiber weight of the first and second sets of fibers.

(25) In still another variant, the at least one layer of the first and second sets of fibers mixed together with a high degree of dispersement is hoop wound.

(26) In yet another variant, the at least one layer of fibers of either only the first set of fibers or only the second set of fibers is hoop wound.

(27) In a further variant, the at least one layer of the first and second sets of fibers mixed together with a high degree of dispersement is helically wound with an angle to a long axis of the vessel ranging from about 5° to 20°.

(28) In still a further variant, the at least one layer of the first and second sets of fibers mixed together with a high degree of dispersement is helically wound with an angle to a long axis of the vessel ranging from about 35° to 75°.

(29) In yet a further variant, the at least one layer of fibers of either only the first set of fibers or only the second set of fibers is helically wound with an angle to a long axis of the vessel ranging from about 5° to 20°.

(30) In another variant of the invention, the at least one layer of fibers of either only the first set of fibers or only the second set of fibers is helically wound with an angle to a long axis of the vessel ranging from about 35° to 75°.

(31) In still another variant, the resin matrix includes a prepreg resin.

(32) In yet another variant, the resin matrix includes a wet winding resin.

(33) In a further variant of the invention, a method of forming an improved pressure vessel includes the following steps. Providing a liner. Coating the liner with a primer. Drying the primer. Mounting the liner in a winding machine. Prepregnating at least first and second sets of fibers. Hoop winding the liner past the tangent points of the liner with either at least one layer of the first and second sets of fibers mixed together with a high degree of dispersement or at least one layer of fibers of either only the first set of fibers or only the second set of fibers. The hoop winding is at about 90° to a long axis of the liner. Helically winding the liner with either at least one layer of the first and second sets of fibers mixed together with a high degree of dispersement or at least one layer of fibers of either only the first set of fibers or only the second set of fibers. The helical winding is at about 5° to 20° to the long axis of the liner. Knuckle winding the liner with either at least one layer of the first and second sets of fibers mixed together with a high degree of dispersement or at least one layer of fibers of either only the first set of fibers or only the second set of fibers. The knuckle winding is at about 35° to 75° to the long axis of the liner. Repeating the hoop winding, helical winding and knuckle winding steps as required by vessel performance requirements. Applying shrink wrap material about an outer surface of the wound liner. Curing the pressure vessel in a curing oven.

(34) In still a further variant of the invention, a method of forming an improved pressure vessel 10 includes the following additional steps instead of prepregnating at least first 25 and second 30 sets of fibers. Mixing epoxy (not shown) and hardener (not shown) in required proportions in a resin bath apparatus (not shown). Directing at least one of first 25 and second 30 sets of fibers through the resin bath apparatus.

(35), (36) In yet a further variant, a method of forming an improved pressure vessel 10 includes the steps of forming the vessel 10 over a mandrel (not shown) rather than a liner 35. The liner 35 is removed after the vessel 10 is cured.

(37) In still another variant of the invention, the method of forming an improved pressure vessel includes the step of inserting at least one layer of fabric between layers of fiber winding. The fabric includes any of selected sets of fibers.

(38), (39) In final variants of the invention, the method of forming an improved pressure vessel includes applying at least one layer of fabric to the liner or mandrel with a resin material. The fabric includes any of selected sets of fibers

BRIEF DESCRIPTION OF THE DRAWINGS

FIG. 1 is a side elevational view of an improved pressure vessel of the present invention illustrating three layers of winding including hoop winding, helical winding, and knuckle winding on a liner;

FIG. 2 is a side elevational view of an alternative embodiment of an improved pressure vessel of the present invention illustrating two layers of winding including hoop winding and helical winding, on a metal inner liner;

Figure 3:
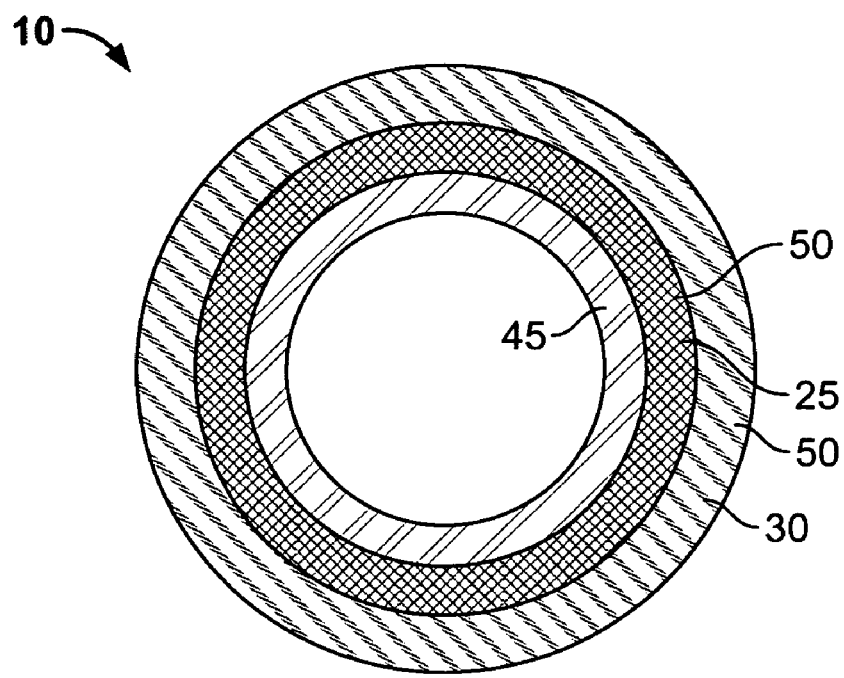
FIG. 3 is a cross-sectional view of an improved pressure vessel of the present invention illustrating three layers of winding without a liner.
Figure 4:
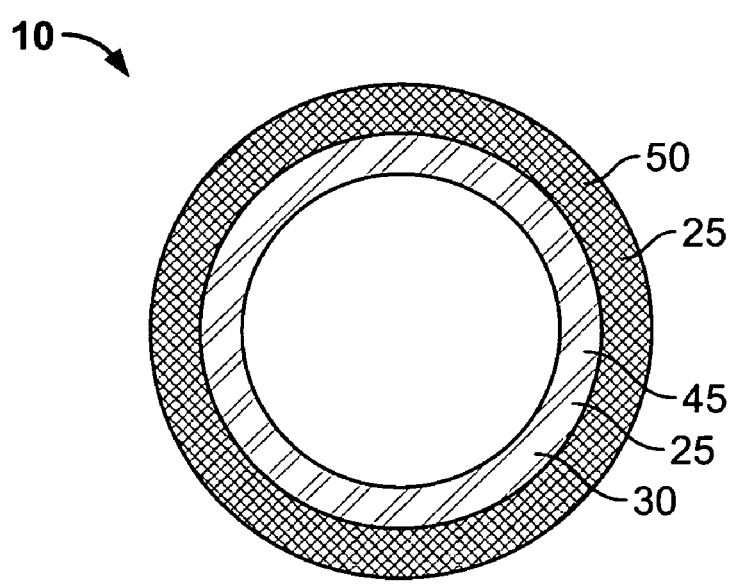
FIG. 4 is a cross-sectional view of an improved pressure vessel of the present invention illustrating two layers of winding without a liner.
Figure 5:
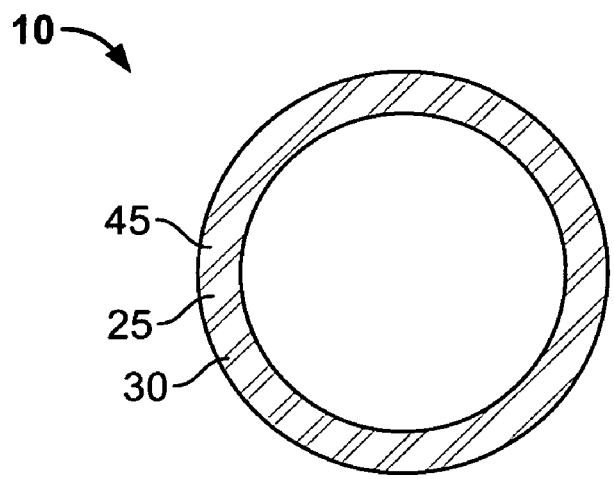
FIG. 5 is a cross-sectional view of an improved pressure vessel of the present invention illustrating a single layer of winding comprising two dispersed sets of fibers without a liner.
Figure 6:
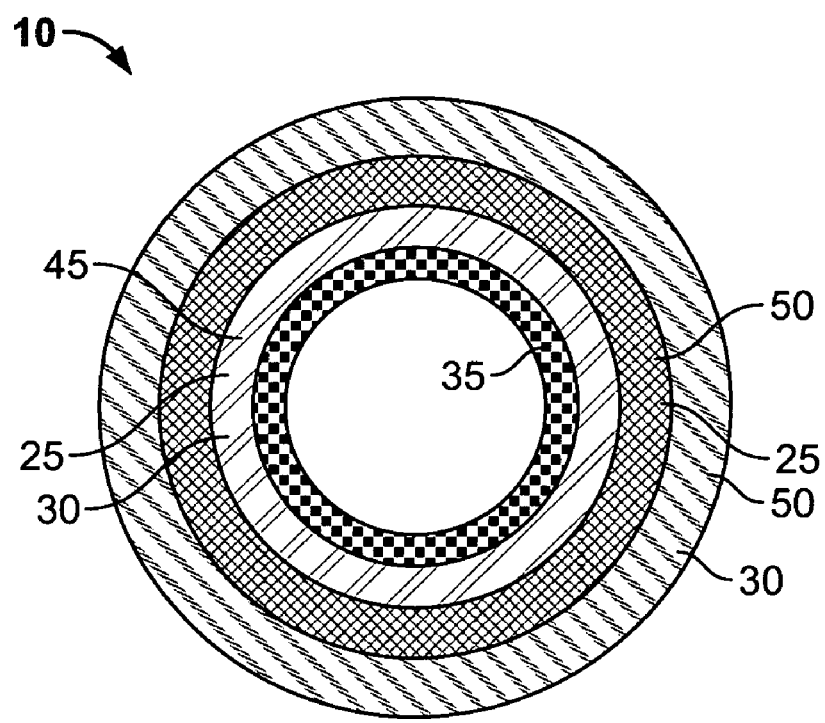
FIG. 6 is a cross-sectional view of an improved pressure vessel of the present invention illustrating three layers of winding with a liner.
Figure 7:
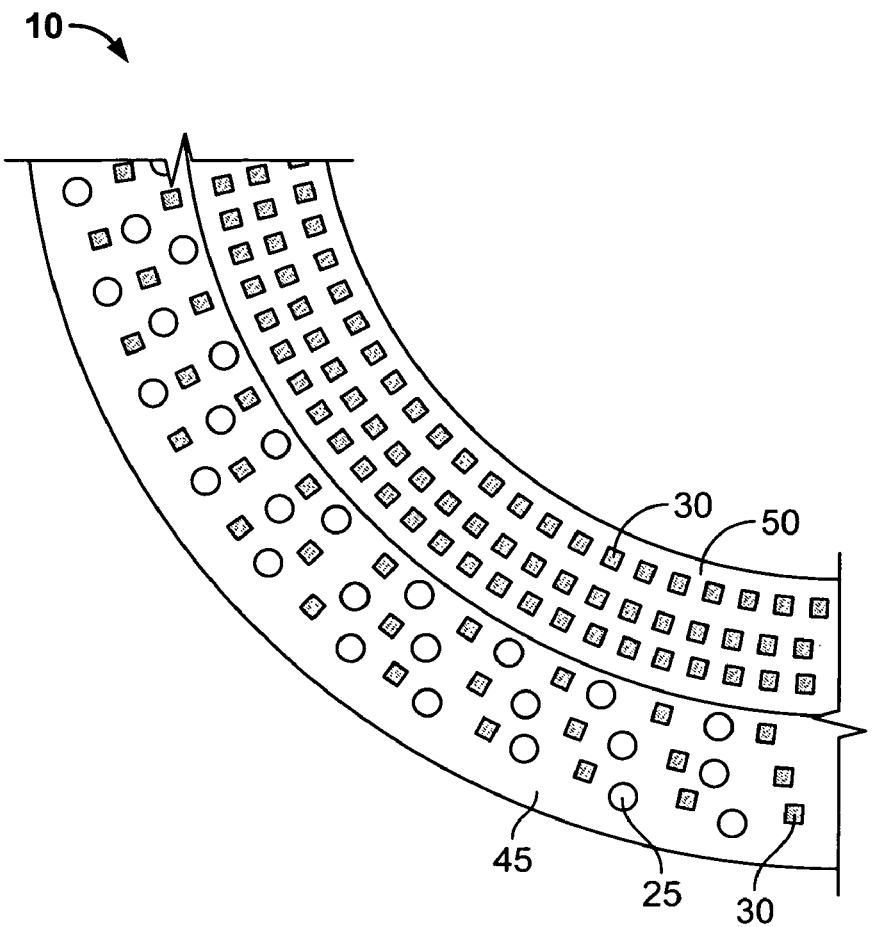
FIG. 7 is an enlarged partial cross-sectional view of an improved pressure vessel of the present invention illustrating a layer of dispersed sets of fibers and a layer of a single set of fibers.

DETAILED DESCRIPTION OF THE PREFERRED EMBODIMENTS (1) An improved pressure vessel 10, as illustrated in FIGS. 1-7, 9 and 10, providing the desired features includes a composite material having fibers 15 located in a resin matrix 20. The improvement includes at least first 25 and second 30 sets of fibers 15.

(2) In a variant of the invention, the first set of fibers 25 includes high strength fibers.

(3) In a further variant, the first set of fibers 25 includes high modulus materials.

(4) In still a further variant, the second set of fibers 30 includes fibers having high toughness characteristics.

(5) In another variant, the second set of fibers 30 includes high modulus materials.

(6) In still another variant, the second set of fibers 30 includes fibers having low stiffness characteristics.

(7) In yet another variant, the second set of fibers 30 includes fibers having low compressibility characteristics.

(8) In still another variant of the invention, the first set of fibers 25 includes materials selected from the group consisting of: carbon, high strength carbon, and steel.

(9) In a further variant of the invention, the second set of fibers 30 includes materials select from the group consisting of: glass, long-chain polyamide (Aramid), liquid crystal polymer, polyethylene, metal, crosslinkable elastomer, crosslinkable thermoplastic, and crosslinkable thermoplastic elastomer.

(10) In still a further variant, the second set of fibers 30 includes p-phenylenebenzobisoxazole.

(11) In yet a further variant, the second set of fibers 30 includes poly{2,6-diimidazo[4,5-b4',5'-e] pyridinylene-1,4 (2,5-dihydroxy)phenylene}, (PIPD) (M-5).

(12) In another variant of the invention, the second set of fibers 30 includes polyaramid polyparaphenylene terephthalamide (Kevlar).

(13) In still another variant, the second set of fibers 30 includes ultra-high-molecular-weight polyethylene (Spectra).

(14) In yet another variant, the second set of fibers 30 includes polyester-polyarylate (Vectran).

(15) In a further variant, the improved pressure vessel 10 includes a thin walled liner 35.

(16) In still a further variant, the improved pressure vessel 10 includes a metal inner lining 40, as illustrated in FIG. 2.

(17) In yet a further variant, as illustrated in FIGS. 3-7, the first 25 and second 30 sets of fibers are mixed together with a high degree of dispersement.

(18) In another variant of the invention, as illustrated in FIGS. 3-6, the fibers 15 include separate distinct layers of the first 25 and second 30 sets of fibers.

(19) In still another variant, as illustrated in FIGS. 3-7, at least one layer 45 of the first 25 and second 30 sets of fibers 15 mixed together with a high degree of dispersement is layered with at least one layer 50 of fibers 15 of either only the first set of fibers 25 or only the second set of fibers 30.

(20) In yet another variant, at least one layer 45 of the first 25 and second 30 sets of fibers 15 mixed together with a high degree of dispersement is layered with at least one layer 50 of fibers of only the first set of fibers 25 and at least one layer 50 of only the second set of fibers 30.

(21) In a further variant of the invention, the second set of fibers 30 includes at least about 10% by fiber weight of the first 25 and second 30 sets of fibers.

(22) In still a further variant, the second set of fibers 30 includes about 5% to 55% by fiber weight of the first 25 and second 30 sets of fibers.

(23) In yet a further variant, the at least one layer 45 of the first 25 and second 30 sets of fibers 15 mixed together with a high degree of dispersement includes about 5% to 30% by fiber weight of the first 25 and second 30 sets of fibers.

(24) In another variant, the at least one layer 50 of fibers of either only the first set of fibers 25 or only the second set of fibers 30 includes about 5% to 30% by fiber weight of the first 25 and second 30 sets of fibers.

(25) In still another variant, at least one layer 45 of the first 25 and second 30 sets of fibers mixed together with a high degree of dispersement is hoop wound 55, as illustrated in FIGS. 1 and 2.

(26) In yet another variant, the at least one layer 50 of fibers of either only the first set of fibers 25 or only the second set of fibers 30 is hoop wound 55.

(27) In a further variant, the at least one layer 45 of the first 25 and second 30 sets of fibers mixed together with a high degree of dispersement is helically wound 60 with an angle to a long axis 65 of the vessel 10 ranging from about 5° to 20°.

(28) In still a further variant, the at least one layer 45 of the first 25 and second 30 sets of fibers mixed together with a high degree of dispersement is helically wound 60 with an angle to a long axis 65 of the vessel 10 ranging from about 35° to 75°.

(29) In yet a further variant, the at least one layer 50 of fibers of either only the first set of fibers 25 or only the second set of fibers 30 is helically wound with an angle to a long axis 65 of the vessel 10 ranging from about 5° to 20°.

(30) In another variant of the invention, the at least one layer 50 of fibers of either only the first set of fibers 25 or only the second set of fibers 30 is helically wound with an angle to a long axis 65 of the vessel 10 ranging from about 35° to 75°.

(31) In still another variant, the resin matrix 20 includes a prepreg resin.

Figure 8:
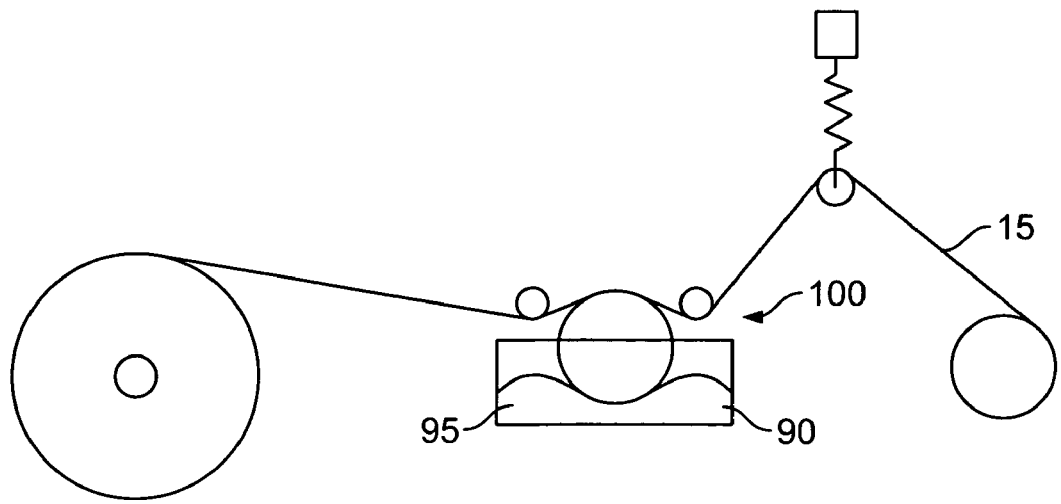
FIG. 8 is a schematic view of a resin bath apparatus for wet winding of improved pressure vessels.

(32) In yet another variant, the resin matrix 20 includes a wet winding resin, as illustrated in FIG. 8.

(33) In a further variant of the invention, a method of forming an improved pressure vessel 10 includes the following steps. Providing a liner 35. Coating the liner 35 with a primer (not shown). Drying the primer. Mounting the liner 35 in a winding machine (not shown). Prepregnating at least first 25 and second 30 sets of fibers. Hoop winding 55 the liner 35 past the tangent points 70 of the liner 35 with either at least one layer 45 of the first 25 and second 30 sets of fibers mixed together with a high degree of dispersement or at least one layer 50 of fibers of either only the first set of fibers 25 or only the second set of fibers 30. The hoop winding 55 is at about 90° to a long axis 65 of the liner 35. Helically winding 60 the liner 35 with either at least one layer 45 of the first 25 and second 30 sets of fibers mixed together with a high degree of dispersement or at least one layer 50 of fibers of either only the first set of fibers 25 or only the second set of fibers 30. The helical winding 60 is at about 5° to 20° to the long axis 65 of the liner 35. Knuckle winding 75 the liner 35 with either at least one layer 45 of the first 25 and second 30 sets of fibers mixed together with a high degree of dispersement or at least one layer 50 of fibers of either only the first set of fibers 25 or only the second set of fibers 30. The knuckle winding 75 is at about 35° to 75° to the long axis 65 of the liner 35. Repeating the hoop winding 55, helical winding 60 and knuckle winding 75 steps as required by vessel 10 performance requirements. Applying shrink wrap material (not shown) about an outer surface 80 of the wound liner 35. Curing the pressure vessel 10 in a curing oven (not shown).

(34) In still a further variant of the invention, a method of forming an improved pressure vessel 10 includes the following additional steps instead of prepregnating at least first 25 and second 30 sets of fibers. Mixing epoxy 90 and hardener 95 in required proportions in a resin bath apparatus 100. Directing at least one of first 25 and second 30 sets of fibers through the resin bath apparatus.

(35), (36) In yet a further variant, a method of forming an improved pressure vessel 10 includes the steps of forming the vessel 10 over a mandrel (not shown) rather than a liner 35. The liner 35 is removed after the vessel 10 is cured.

Figure 9:
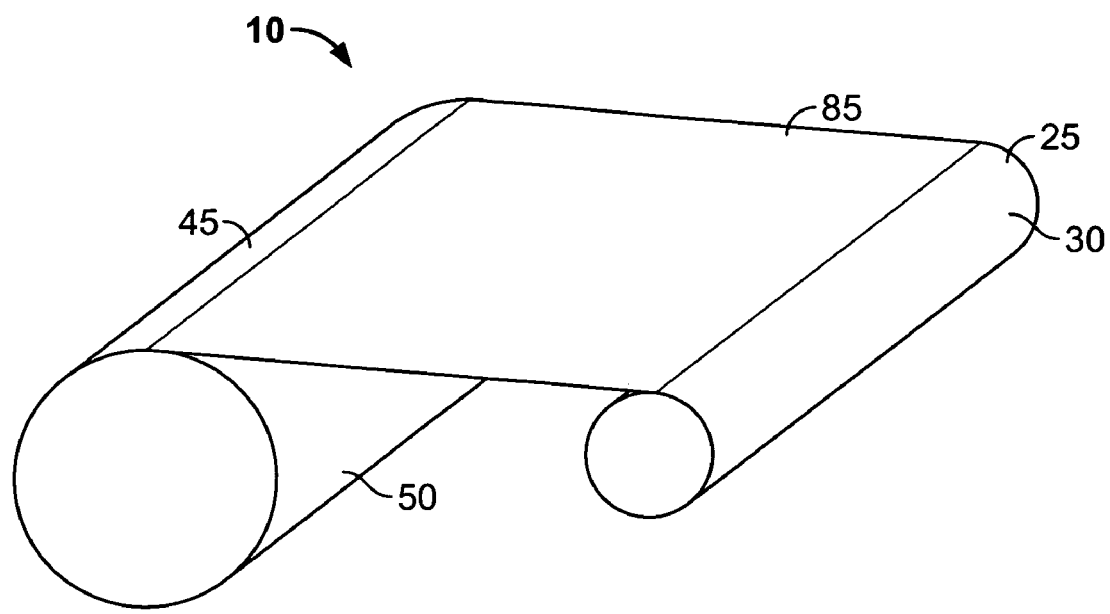
FIG. 9 is a perspective view of insertion of a fabric layer between two winding layers on an improved pressure vessel.

(37) In still another variant of the invention, as illustrated in FIG. 9, the method of forming an improved pressure vessel 10 includes the step of inserting at least one layer of fabric 85 between layers 45, 50 of fiber winding. The fabric 85 includes any of selected sets of fibers 25, 30.

Figure 10:
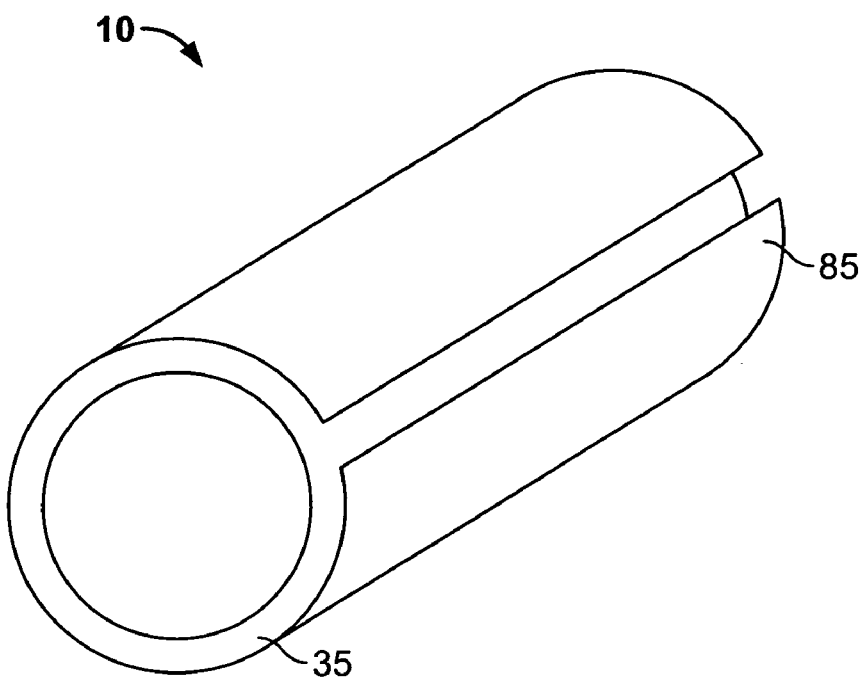
FIG. 10 is a perspective view of fabric of selected fibers being applied to a liner.
Figure 11:
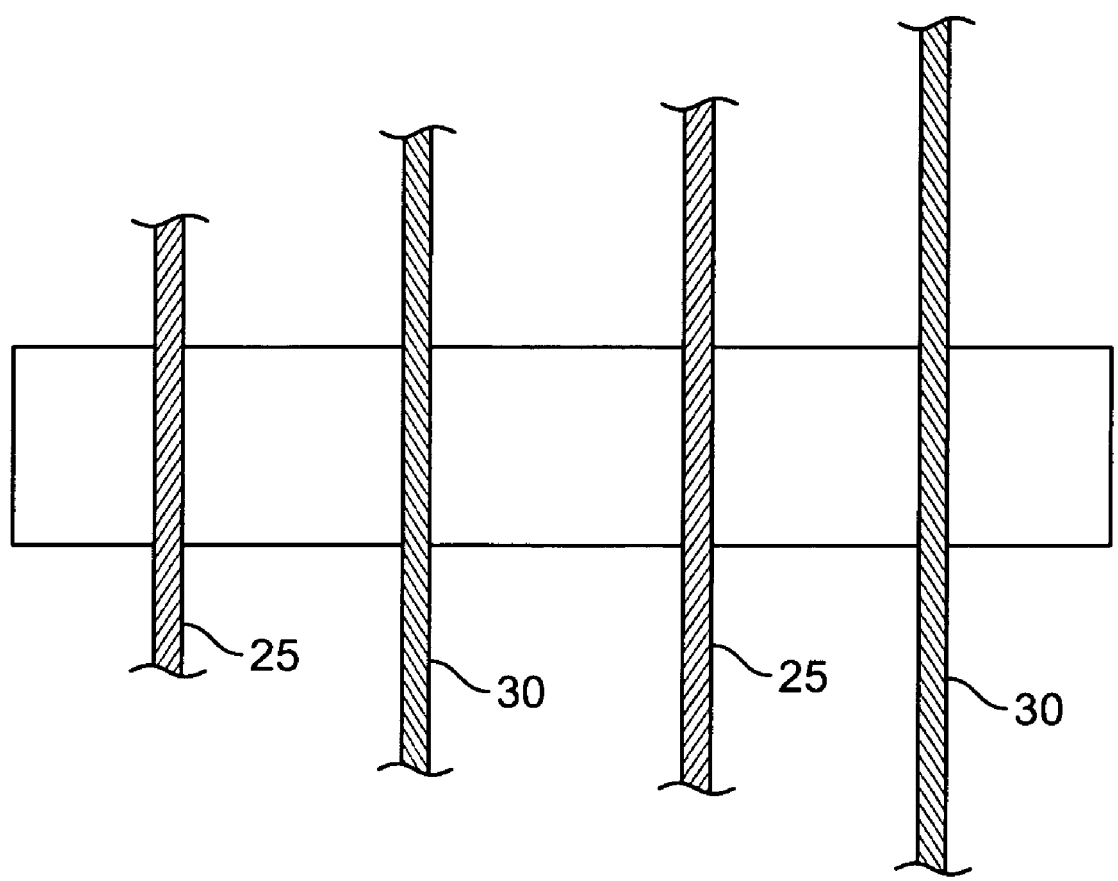
FIG. 11 is a partial schematic view of highly dispersed fibers in process of winding.

(38), (39) In final variants of the invention, as illustrated in FIG. 10, the method of forming an improved pressure vessel 10 includes applying at least one layer of fabric 85 to the liner 35 or mandrel with a resin matrix 20. The fabric 85 includes any of selected sets of fibers 25, 30.

It will, of course, be understood that pressure vessel 10 may be of other shapes and forms than that illustrated in FIGS. 1 and 2. It will also be appreciated that the FIGS. 3-6 are not to scale and that, for example, the relative thicknesses shown therein are not necessarily those of the actual pressure vessels 10. Further, it should be understood that the present invention is not limited to pressure vessels having an inner liner 35 or a separate inner tank structure, i.e., metal lining 40 can be omitted in some embodiments.

As described above, an important aspect of the present invention concerns provision of a combination of PBO fibers and, most preferably, p-phenylenebenzobisoxazole fibers, and carbon fibers, preferably in resin matrix, that is ideally suited as a composite overwrap or shell for a pressure vessel such as pressure vessel 10 of FIGS. 1 and 2, particularly with respect to improved strength and impact resistance.

In a specific non-limiting embodiment, tanks or pressure vessels 10 of the type contemplated here are typically composed of a thin walled aluminum pressure vessel liner 35 which is overwrapped with a fiber/epoxy resin reinforcement 20, although the present invention is also applicable to other composite structures as well, including, as indicated above, stand-alone composites without an inner lining 35 or an inner tank structure.

An important aspect of hybridizing PBO (e.g., Zylon®) fibers with carbon fibers is that the resultant composite can be tailored to achieve desired performance characteristics based on the type and percentage of the fibers used. In this regard, depending on the specific structural requirements of the item being fabricated, either high strength or high modulus PBO fibers can be used in conjunction with either high strength or high modulus carbon fibers.

Using the basic fiber combination, improvements in robustness has been demonstrated with different combinations. Important embodiments use aerospace grade carbon fiber, specifically the Toray T-1000 12 k fiber. In another important embodiment, high strength Zylon® fiber is combined with T-1000 fiber to fabricate very thin wall, very high performance pressure vessels 10. Testing of this embodiment has shown that the corresponding composite has a damage tolerance significantly greater than demonstrated by a pressure vessel made with T-1000 carbon fibers alone.

The percentage of PBO fiber used with respect to carbon fiber is important and the strength performance to impact performance characteristics can be varied as a function of these percentages. In this regard it has been demonstrated that relatively small percentages of PBO (approximately 10% Zylon® by fiber weight) can significantly affect the composite impact robustness.

Similarly, testing has demonstrated that the sequencing of the composite wrap pattern using the hybrid fiber composite of PBO and carbon fibers can be tailored to achieve certain characteristics. Performance characteristics such as, but not limited to, impact resistance, burst pressure and cycle capabilities may be enhanced, or reduced, as appropriate for any given application. For example, a high degree of dispersement of the fiber mix has been shown to result in superior burst pressure characteristic particularly with hoop to helical wind sequencing. In another example, separate and distinct layers of PBO fibers and carbon fibers in a highly segregated wind sequence has been shown to result in optimal impact capabilities.

Impact improvement has been demonstrated using a wide variety of resin systems although some fiber resin combinations have shown to be more impact resistant than others. Significant performance improvements have been noted using the fiber combination of the invention in conjunction with both Thiokol TCR UF-3325 prepreg resin as well as Shell EPON 828 wet winding resin.

Applications for which the present invention are of particular interest include high performance composite pressure vessels (both commercial and aerospace/military) where the improved low velocity impact resistance provided will improve the overall safety of the pressure vessel. An example of this would be self-contained breathing apparatus mentioned above used in both commercial and military applications. In this regard, such vessels are subjected to tremendous low velocity abuse. Another application is composite pressure vessels for aerospace/military use where the significantly improved high velocity impact capabilities thereof would improve mission survivability and significantly reduce the possibility of collateral damage due to high velocity punctures of the pressurized pressure vessels.

Although the invention has been described above in relation to preferred embodiments thereof, it will be understood by those skilled in the art that variations and modifications can be effected in these preferred embodiments without departing from the scope and spirit of the invention.

The invention claimed is:

1. An improved composite over-wrapped pressure vessel having a thin wall, a hollow center and a longitudinal axis; said thin wall comprising a composite material having fibers disposed in a resin matrix, the improvement comprising at least a first and a second set of fibers of different types; said first and second sets of fibers of different types are mixed together; one layer of said first and second sets of fibers are helically oriented with respect to said longitudinal axis; and a second layer of said first and second sets of fibers are hoop oriented with respect to said longitudinal axis;

said second set of fibers comprise about 5% to 55% fiber weight of said first and second sets of fibers;

said first set of fibers selected from the group consisting of: carbon, high strength carbon, and steel; and said second set of fibers selected from the group consisting of:

glass, long-chain polyamide, liquid crystal polymer, polyethylene, metal, crosslinkable elastomer, crosslinkable thermoplastic, crosslinkable thermoplastic elastomer, p-phenylenebenzobisoxazole, Poly{2,6-diimidazo[4,5-b4',5'-e]pyridinylene-1,4(2,5-dihydroxy)phenylene}, (PIPD) (M-5), polyaramid polyparaphenylene terephthalamide, ultra-high-molecular-weight polyethylene and polyester-polyarylate.

2. The improved pressure vessel, as described in claim 1, further comprising a thin walled liner.

3. The improved pressure vessel, as described in claim 1, further comprising a metal inner lining.

4. The improved pressure vessel, as described in claim 1, wherein at least one of said first and second sets of fibers are in contact with a primer coated liner.

5. The improved pressure vessel, as described in claim 1, wherein said second set of fibers comprise at least about 10% by fiber weight of said first and second sets of fibers.

6. The improved pressure vessel, as described in claim 4, wherein said at least one layer of said first and second sets of fibers mixed together is helically wound with an angle to a long axis of the vessel ranging from about 5° to 20°.

7. The improved pressure vessel, as described in claim 4, wherein said at least one layer of said first and second sets of fibers mixed together is helically wound with an angle to a long axis of the vessel ranging from about 35° to 75°.

8. The improved pressure vessel, as described in claim 1, wherein said resin matrix comprises a prepreg resin.

9. The improved pressure vessel, as described in claim 1, wherein said resin matrix comprises a wet winding resin.

10. An improved composite over-wrapped pressure vessel having a thin wall, a hollow center and a longitudinal axis; said thin wall comprising a composite material having fibers disposed in a resin matrix, the improvement comprising at least a first and a second set of fibers of different types; at least one layer of fibers of only said first set being helically oriented with respect to said longitudinal axis; and at least one layer of fibers only said second set being hoop oriented with respect to said longitudinal axis;

said second set of fibers comprise about 5% to 55% fiber weight of said first and second sets of fibers;

said first set of fibers selected from the group consisting of: carbon, high strength carbon, and steel; and said second set of fibers selected from the group consisting of:

glass, long-chain polyamide, liquid crystal polymer, polyethylene, metal, crosslinkable elastomer, crosslinkable thermoplastic, crosslinkable thermoplastic elastomer, p-phenylenebenzobisoxazole, Poly{2,6-diimidazo[4,5-b4',5'-e]pyridinylene-1,4(2,5-dihydroxy)phenylene}, (PIPD) (M-5), polyaramid polyparaphenylene terephthalamide, ultra-high-molecular-weight polyethylene and polyester-polyarylate.

11. The improved pressure vessel, as described in claim 10, wherein said at least one layer of fibers of either of only said first set of fibers and only said second set of fibers comprise about 5% to 30% fiber weight of said first and second sets of fibers.

12. The improved pressure vessel, as described in claim 10, wherein said at least one layer of fibers of either of only said first set of fibers and only said second set of fibers is helically wound with an angle to a long axis of the vessel ranging from about 5° to 20°.

13. The improved pressure vessel, as described in claim 10, wherein said at least one layer of fibers of either of only said first set of fibers and only said second set of fibers is helically wound with an angle to a long axis of the vessel ranging from about 35° to 75°.

14. An improved composite over-wrapped pressure vessel having a thin wall, a hollow center and a longitudinal axis; said thin wall comprising a composite material having fibers disposed in a resin matrix, the improvement comprising at least a first and a second set of fibers of different types; an inner layer of said first and second sets of fibers are mixed together; said layer being hoop wound with respect to said longitudinal axis; and a second, outer layer of fibers of either of only said first set and only said second set of fibers, said fibers are helically oriented with respect to said longitudinal axis; and said second set of fibers comprising about 5% to 55% fiber weight of said first and second sets of fibers;

said first set of fibers selected from the group consisting of: carbon, high strength carbon, and steel; and said second set of fibers selected from the group consisting of:

glass, long-chain polyamide, liquid crystal polymer, polyethylene, metal, crosslinkable elastomer, crosslinkable thermoplastic, crosslinkable thermoplastic elastomer, p-phenylenebenzobisoxazole, Poly{2,6-diimidazo[4,5-b4',5'-e]pyridinylene-1,4(2,5-dihydroxy)phenylene}, (PIPD) (M-5), polyaramid polyparaphenylene terephthalamide, ultra-high-molecular-weight polyethylene polyester-polyarylate.

15. The improved pressure vessel, as described in claim 14, wherein said at least one layer of said first and second sets of fibers mixed together comprise about 5% to 30% fiber weight of said first and second sets of fibers.

16. The improved pressure vessel, as described in claim 14, wherein said second, outer layer of fibers of either of only said first set and only said second set of fibers is helically wound with an angle to a long axis of the vessel ranging from about 5° to 20°.

17. The improved pressure vessel, as described in claim 14, wherein said second, outer layer of fibers of either of only said first set and only said second set of fibers is helically wound with an angle to a long axis of the vessel ranging from about 35° to 75°.

18. An improved composite over-wrapped pressure vessel having a thin wall, a hollow center and a longitudinal axis; said thin wall comprising a composite material having fibers disposed in a resin matrix, the improvement comprising at least a first and a second set of fibers of different types; at least one layer of said first and second sets of fibers are mixed together; said layer being helically oriented with respect to said longitudinal axis; and at least one layer of fibers of only said first set, said fibers being hoop oriented with respect to said longitudinal axis;

and at least one layer of fibers of only said second set, said fibers being helically oriented with respect to said longitudinal axis;

said first set of fibers selected from the group consisting of:

carbon, high strength carbon, and steel; and said second set of fibers selected from the group consisting of:

glass, long-chain polyamide, liquid crystal polymer, polyethylene, metal, crosslinkable elastomer, crosslinkable thermoplastic, crosslinkable thermoplastic elastomer, p-phenylenebenzobisoxazole, Poly{2,6-diimidazo[4,5-b4',5'-e]pyridinylene-1,4(2,5-dihydroxy)phenylene}, (PIPD) (M-5) polyaramid polyparaphenylene terephthalamide, ultra-high-molecular-weight polyethylene and polyester-polyarylate.

19. The improved pressure vessel, as described in claim 18 wherein at least one of said layers is helically wound with an angle to a long axis of the vessel ranging from about 5° to 20°.

20. The improved pressure vessel, as described in claim 18 wherein at least one of said layers is helically wound with an angle to a long axis of the vessel ranging from about 35° to 75°.

* * * * *